Patented Sept. 4, 1934

1,972,798

UNITED STATES PATENT OFFICE 1,972,798

TANNING ANIMAL HIDES

Josef Schäfer, Basel, Switzerland, assignor to firm "J. R. Geigy S. A.," Basel, Switzerland No Drawing. Original application August 17, 1932, Serial No. 629,239. Divided and this application July 13, 1933, Serial No. 680,333. In Germany September 5, 1931

4 Claims. (Cl. 149—5)

This application is a division of the application Ser. No. 629,239 filed August 17, 1932, by the same applicant.

The artificial tanning agents at present in use in the leather industry are generally made from phenols, either by condensing phenol sulphonic acids with formaldehyde or by converting phenol aldehyde resins into water soluble form by direct sulphonation or, as has recently been proposed, by heating them with aromatic sulphonic acids or with the crude reaction mixtures of the sulphonation of aromatic hydrocarbons.

Leather which has been made with the aid of these agents has the disadvantage that its fullness is inferior to that of vegetable tanned leather. Moreover it is not fast to light and becomes yellow rapidly and to a considerable degree not only on exposure to light but also during storage in a dark place. Furthermore some of these agents, as well as leather which has been tanned with them, have an extremely unpleasant odour of phenol.

It is known in the artificial resin industry that products which are suitable as substitutes for shellac and copal but, in comparison with phenolic artificial resins, are faster to light and odourless can be obtained by using as parent material a dihydroxydiphenylsulphone instead of phenol. These products have not been proposed for use in tanning and in fact do not come into consideration owing to their insolubility in water.

According to this invention leather which is very fast to light and is not inferior in fullness to vegetable tanned leather is obtained by treating the skins to be tanned with suitable soluble condensation products of para-dihydroxydiphenylsulphone obtained by treating para-dihydroxydiphenylsulphone with sulphur chloride in an aqueous solution of a sulphonic acid of an aromatic hydrocarbon, such as naphthalene sulphonic acid. If this reaction is carried out with a phenol instead of the para-dihydroxydiphenylsulphone there cannot be obtained by this very simple method condensation products of the desired solubility.

When para-dihydroxydiphenylsulphone is used as parent material use may also be made of the more complicated methods above indicated in connection with phenolic resins. Products which are yet faster to light can also be obtained if instead of the sulphonic acids hereinbefore referred to there are used sulphonic acids of the most varied phenol ethers, particularly the substituted phenol ethyl ethers.

The following example illustrates the invention, the parts being by weight:—

100 parts of skins are treated in 200 parts of water with 50 parts of a tanning agent obtained in the following manner:—

50 parts of sulphur chloride are introduced at 110° C. into a mixture of 100 parts of naphthalene sulphonic acid and 50 parts of dihydroxydiphenylsulphone and the whole is then heated at 130° C. for one hour. The product is dissolved in water, neutralized with caustic soda solution, evaporated and mixed with 10 per cent of its weight of sodium silicofluoride.

There is obtained with the aid of this tanning agent a full yellowish white leather very fast to light.

What I claim is:

1. A process for tanning animal skins, consisting in treating the skins with a water soluble condensation product of para-dihydroxydiphenylsulphone and sulphur chloride.

2. A process for tanning animal skins, consisting in treating the skins with a condensation product of para-dihydroxydiphenylsulphone and sulphur chloride in an aqueous sulphonated medium.

3. A process for tanning animal skins, consisting in treating the skins with a condensation product of para-dihydroxydiphenylsulphone and sulphur chloride in an aqueous solution of a sulphonic acid of an aromatic hydrocarbon.

4. A process for tanning animal skins, consisting in treating the skins with a condensation product of para-dihydroxydiphenylsulphone and sulphur chloride in an aqueous solution of naphthalene sulphonic acid.

JOSEF SCHÄFER.